(12) United States Patent
Marin et al.

(10) Patent No.: US 7,320,288 B2
(45) Date of Patent: Jan. 22, 2008

(54) STEAM-GENERATING COMBUSTION SYSTEM AND METHOD FOR EMISSION CONTROL USING OXYGEN ENHANCEMENT

(75) Inventors: Ovidiu Marin, Lisle, IL (US); Scott Macadam, Chicago, IL (US); Erwin Penfornis, Oak Park, IL (US); Fabienne Chatel-Pelage, Chicago, IL (US)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 11/140,868

(22) Filed: May 31, 2005

(65) Prior Publication Data

US 2005/0233274 A1 Oct. 20, 2005

Related U.S. Application Data

(63) Continuation of application No. 10/366,114, filed on Feb. 12, 2003, now Pat. No. 6,935,251.

(60) Provisional application No. 60/380,808, filed on May 15, 2002, provisional application No. 60/357,414, filed on Feb. 15, 2002.

(51) Int. Cl.
*F23J 15/00* (2006.01)

(52) U.S. Cl. .................. 110/345; 110/233; 110/341; 110/348

(58) Field of Classification Search ............. 110/204, 110/205, 345, 346, 347–348, 233, 234; 60/39.5, 60/39.52; 423/210
See application file for complete search history.

(56) References Cited

U.S. PATENT DOCUMENTS

4,553,988 A * 11/1985 Shimizu et al. .............. 96/7

(Continued)

FOREIGN PATENT DOCUMENTS

CA 2096414 C 5/1992

(Continued)

OTHER PUBLICATIONS

N. Nsakala, J. Marion, C. Bozzuto, g. Liljedahl, M. Palkes, D. Vogel, M. Guha, H. Johnson, S. Plasynski, Engineering Feasibility of CO2 Capture on an Existing US Coal-Fired Power Plant, Presentation at the First National Conference on Carbon Sequestration, May 15-17, 2001, Washington DC.

(Continued)

*Primary Examiner*—Kenneth Rinehart
(74) *Attorney, Agent, or Firm*—Elwood L. Haynes

(57) ABSTRACT

A steam-generating combustion system includes an oxygen enriched gas provided as at least part of an oxidant stream. A combustion chamber receives and combusts a fuel in the oxidant stream and generate steam. The combustion chamber generates flue gas having a flue gas volume which is smaller than a volume of flue gas generated by the combustion chamber when operated with air as the oxidant stream. A flue gas pollutant control system receives the flue gas from the combustion chamber and reduces at least one of particulate matter, $SO_x$, $NO_x$, and mercury. The reduction in flue gas volume allows the implementation of much smaller pollutant control equipment, since the size of the pollutant control units is mainly based on the volume or mass flow rate of flue gas to be treated. Moreover, the system including oxygen-enriched gas in the oxidant will lead to concentrated levels of the pollutants in the flue gas. The high concentrations of pollutants will enhance their absorption in the different pollutant control systems, improving removal efficiency for all species.

7 Claims, 6 Drawing Sheets

U.S. PATENT DOCUMENTS

| | | | |
|---|---|---|---|
| 4,762,074 A * | 8/1988 | Sorensen | 110/346 |
| 5,309,850 A * | 5/1994 | Downs et al. | 110/235 |
| 5,396,848 A * | 3/1995 | Kuo | 110/234 |
| 5,402,739 A * | 4/1995 | Abboud et al. | 110/346 |
| 5,535,687 A * | 7/1996 | Khanna | 110/345 |
| 5,590,519 A * | 1/1997 | Almlof et al. | 60/801 |
| 5,752,452 A * | 5/1998 | Leger | 110/346 |
| 5,771,823 A * | 6/1998 | Vierstra et al. | 110/347 |
| 5,802,840 A * | 9/1998 | Wolf | 60/772 |
| 5,871,703 A * | 2/1999 | Alix et al. | 423/210 |
| 5,918,555 A * | 7/1999 | Winegar | 110/345 |
| 5,960,722 A * | 10/1999 | Kiss | 110/229 |
| 5,992,337 A * | 11/1999 | Philippe et al. | 110/348 |
| 6,117,403 A * | 9/2000 | Alix et al. | 423/210 |
| 6,132,692 A * | 10/2000 | Alix et al. | 423/210 |
| 6,314,896 B1 * | 11/2001 | Marin et al. | 110/345 |
| 6,485,289 B1 | 11/2002 | Kelly et al. | |
| 6,505,567 B1 | 1/2003 | Anderson et al. | |
| 6,619,041 B2 * | 9/2003 | Marin et al. | 60/653 |
| 6,702,570 B2 | 3/2004 | Shah et al. | |
| 2003/0097840 A1 | 5/2003 | Hsu | |
| 2003/0101726 A1 | 6/2003 | Marin et al. | |

FOREIGN PATENT DOCUMENTS

| | | |
|---|---|---|
| CA | 2094690 C | 10/1993 |
| CA | 2121295 C | 10/1994 |
| CA | 2117286 C | 11/1994 |
| CA | 2124432-AA | 1/1995 |
| CA | 2404299-AA | 9/2001 |
| CA | 2410086-AA | 12/2001 |
| CA | 2270335 C | 12/2002 |
| CA | 2513382-AA | 8/2004 |
| CA | 2516069-AA | 9/2004 |
| CA | 2537051-AA | 3/2005 |
| CA | 2540583-AA | 4/2005 |
| WO | WO-9624804 A1 | 8/1996 |
| WO | WO-02070951 A1 | 9/2002 |

OTHER PUBLICATIONS

M. Wilkinson, J. Boden, R. Panesar, R. Allam, CO2 Capture via Oxyfuel Firing: Optimisation of a Retrofit Design Concept for a Refinery Power Station Boiler, First National Conference on Carbon Sequestration, May 15-17, 2001, Washington DC.

G. Berry, A. Wolsky, Modeling Heat Transfer in an Experimental Coal-Fired Furnace When CO2/O2 Mixtures Replace Air, presentation at the 1986 Winter Annual Meeting of the American Society for Mechanical Engineers, Dec. 7-12, Anaheim, CA.

* cited by examiner

STEAM-GENERATING COMBUSTION SYSTEM AND METHOD FOR EMISSION CONTROL USING OXYGEN ENHANCEMENT

CROSS REFERENCE TO RELATED APPLICATIONS

This application is a continuation of U.S. Non-Provisional Patent Application No. 10/366,114, filed Feb. 12, 2003, now U.S. Pat. No. 6,935,251, which claims priority to U.S. Provisional Patent Application No. 60/357,414, filed Feb. 15, 2002, and U.S. Provisional Patent Application No. 60/380,808, filed May 15, 2002, which are incorporated herein by reference in their entirety.

FIELD OF THE INVENTION

The invention relates to a system and method for improved emissions control from a steam-generating combustion system using a combination of an oxygen-enhanced firing process and flue gas treatment systems.

DESCRIPTION OF THE RELATED ART

Industrial combustion systems are the main source of sulfur dioxide ($SO_2$), nitrogen oxides ($NO_x$) and mercury (Hg) emissions, as well as carbon dioxide ($CO_2$). Whether it is through the Kyoto Protocol or through recent initiatives from the U.S. government, these industrial combustion plants will now have to comply with more and more stringent regulations regarding these pollutants.

The combustion of fossil fuels in utility boilers, industrial boilers, furnaces, kilns, etc. results in the formation of significant levels of pollutants. Coal combustion, for instance, leads to the generation of inter alia $SO_x$, $NO_x$, Hg, and particulate matter. All these substances have been proven to be detrimental to human health.

The typical method of reducing particulates, Hg, $NO_x$, and $SO_2$ emissions from steam generating boilers used by electric utilities is by the use of flue gas treatment equipment including electrostatic precipitators (ESP), fabric filter bag houses, catalytic systems, or wet and dry scrubbers. These devices are large and very expensive to purchase and operate, significantly raising the capital cost of the facility and increasing operating costs. They typically require large amounts of space at the plant site and increase the cost of electricity produced at an electric utility by up to fifty percent.

In glass making furnaces, oxygen-enriched combustion has been used mainly for two reasons: to increase efficiency of the process and to reduce the generation of $NO_x$. For example, the efficiency of glass making is increased by providing about 20-25% fuel savings with oxy-combustion as compared to air-combustion.

However, the use of oxygen enriched combustion in glass furnaces does not affect the volume of flue gas to be treated, since the high temperature flue gas exiting the furnace is diluted in air to reduce its temperature prior to treatment of the flue gas to remove harmful emissions. Thus, the flue gas treatment cost, based on the volume of flue gas to be treated, remains substantially constant when changing from air firing to oxygen enriched firing in glass making furnaces. Finally, the cost of the oxygen generation has to be taken into account. Thus, the improved $NO_x$ emissions and energy efficiency resulting from oxygen enriched firing in glass furnaces do not always translate to an associated cost savings in these furnaces.

In contrast, in steam generating boilers, such as those used in electric power generating facilities, the amount of pollution produced by the boiler is generally high due to the fuels used and the cost of pollution control is a very significant portion of the cost of producing power.

One way of reducing the flue gas treatment costs for power generating combustion systems is to combine the various pollutant reduction techniques into a single operation, known as multi-pollutant control. In Alix et al. (U.S. Pat. Nos. 6,132,692; 6,117,403; and 5,871,703), and McLarnon et al. (McLarnon, C. R., Jones, M. D., "Electro-Catalytic Oxidation Process for Multi-Pollutant Control at First Energy's R. E. Burger Generating Station", presented at Electric Power 2000, Cincinnati, Ohio, Apr. 5, 2000.), a process is proposed for reducing $NO_x$, $SO_2$, Hg, and particulate emissions in a single system utilizing a plasma-based discharge barrier reactor to oxidize $NO_x$, $SO_2$, and Hg to $HNO_3$, $H_2SO_4$, and HgO respectively. In this reactor, a pulsating discharge between two electrodes separated by a dielectric produces radical species such as OH, O, and H at relatively low temperatures (150-300 F). These radicals rapidly convert $SO_x$, $NO_x$, and Hg to higher oxides. The acids, HgO, and particulates are subsequently removed in a wet electrostatic precipitator. However, because of the important amount of gas to be treated, the power consumption of the reactor can be fairly high, up to about 5% of the power plant. This process is only described for air-fired combustion applications, and no reference is made to oxygen-enriched systems.

It would be desirable to provide a process for improved emission control in boilers producing power and/or steam through utilization of oxygen-enhanced combustion.

SUMMARY OF THE INVENTION

The present invention relates to a combustion system with an oxygen-enriched gas stream and a pollutant control system for achieving improved emissions at a reduced cost.

In accordance with one embodiment of the present invention a steam-generating combustion system includes an oxidant delivery system providing an oxidant stream, an oxygen enriched gas generation system providing an oxygen enriched gas with 21% to 100% oxygen to the oxidant delivery system, a fuel delivery system providing a fuel stream with a fuel mass flow rate, a combustion chamber arranged to receive and combust the fuel stream in the oxidant stream and generate steam, the combustion chamber generating flue gas having a flue gas mass flow rate which is smaller than a mass flow rate of flue gas generated by the combustion chamber when operated with the same fuel mass flow rate and with air as the oxidant stream, and a flue gas pollutant control system receiving the flue gas from the combustion chamber and reducing the amount of at least one of particulate matter, $SO_x$, $NO_x$, and mercury in the flue gas.

In accordance with a further embodiment of the present invention a method of steam-generating combustion includes providing an oxygen-enriched gas stream with an oxygen content of 21% to 100%, creating an oxidant stream containing the oxygen enriched gas stream, combusting a fuel in the oxidant stream in a steam-generating combustion chamber and generating flue gas having a flue gas mass flow rate which is smaller than a mass flow rate of flue gas generated by the combustion chamber when operated with the same mass flow rate of fuel and with air as the oxidant stream, and reducing the amount of at least one of particulate matter, $SO_x$, $NO_x$, and mercury in the flue gas with a flue gas pollutant control system.

In accordance with another embodiment of the present invention a method of retrofitting or repowering a commercial air-fired, steam-generating combustion system to reduce overall cost of emission control includes adding an oxygen-enriched gas generation system to the air-fired, steam-generating combustion system to deliver an oxygen enriched stream with 21% to 100% oxygen, delivering the oxygen-enriched stream to an oxidant delivery system to produce an oxidant stream for a combustion chamber of the combustion system, achieving a reduced mass flow rate of flue gas exiting the combustion chamber due to enhancement of the oxidant with the oxygen-enriched gas stream, and modifying a flue gas pollution control system of the combustion system to take advantage of the flue gas mass flow rate reduction.

BRIEF DESCRIPTION OF THE DRAWING FIGURES

The invention will now be described in greater detail with reference to the preferred embodiments illustrated in the accompanying drawings, in which like elements bear like reference numerals, and wherein.

DETAILED DESCRIPTION OF THE INVENTION

The invention involves a steam-generating combustion system and method for emission control using oxygen enhancement. The process of substituting at least a portion of the combustion air for a steam-generating combustion system with an oxidant resulting from an oxygen-enriched gas diluted or not with recirculated flue gas, air, $N_2$, $CO_2$ or steam according to the present invention reduces the volume and mass flow rate of flue gas leaving the combustion chamber or plant where combustion takes place, thus creating favorable conditions for a more efficient and cost-effective control of flue gas pollutants. A significant advantage of the addition of an oxygen enriched gas stream, is that the reduction in flue gas volume will allow the implementation of much smaller pollutant control equipment, since the size of all these units is mainly based on the volume or mass flow rate of flue gas to be treated.

To meet the increasingly stringent emissions control standards, pulverized coal-fired boilers and other steam-generating combustion systems are now required to be equipped with a variety of flue gas treatment systems. For a power plant, these devices represent significant cost increases, both in terms of capital and operating costs. In a typical coal-fired power plant, the emission control equipment could consist of a baghouse and/or an ESP (electrostatic precipitator) for particulate removal, a wet flue gas desulfurizer (FGD) for $SO_x$ control, a SCR (selective catalytic reduction) system for effective $NO_x$ control, and a mercury abatement system. A major benefit of the addition of an oxygen enriched gas stream is the fact that the flue gas exhaust mass flow rate is significantly reduced and consequently, the volume of flue gas is significantly reduced compared to a volume of flue gas generated by the combustion chamber when operated with the same mass flow rate of fuel, the same oxygen to fuel ratio (or same oxygen mass flow rate), and with air as the oxidant stream.

Since the size and costs of the emission control systems mentioned above are dependent on flue gas mass flow rates or volume, the addition of an oxygen enriched gas stream can lead to significant cost savings. The use of an oxygen enriched gas also has inherent $CO_2$ capture capabilities in that it produces, when containing high oxygen content and very low nitrogen content, a $CO_2$-rich flue gas, which can be easily conditioned, compressed, and ultimately delivered to a sequestration site. $CO_2$ capture is provided as an added bonus, when compared to the traditional air-fired operation.

The embodiments described below offer the potential of reducing $SO_x$, $NO_x$, mercury emissions, and particulate matter to compliance levels at an attractive cost. In addition, when carbon sequestration becomes a necessity, it will be possible to deliver the $CO_2$-rich flue gas to a sequestration site with a relatively small amount of additional processing.

Figure 1:
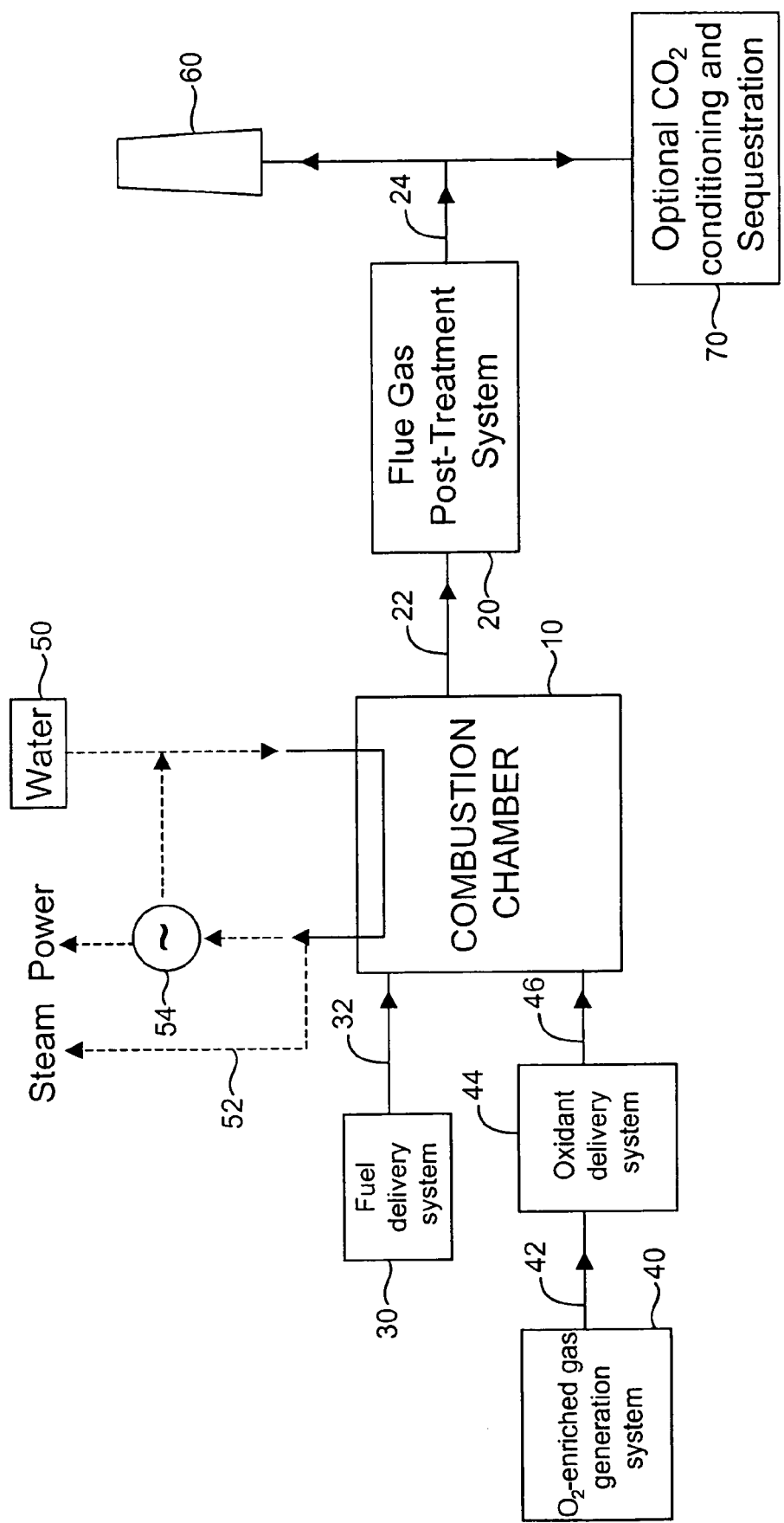
FIG. 1 is a schematic diagram of one embodiment of a steam-generating combustion system according to the present invention.

FIG. 1 illustrates one embodiment of a steam-generating combustion system including a combustion chamber 10 and a flue gas post-treatment pollutant control system 20 designed for operation with oxygen enhancement. The terms "oxygen enhancement" and "oxygen-enhanced combustion" refer to combustion with an oxidant stream at least part of which is an oxygen enriched gas stream. The term "oxygen enriched gas" refers to a gas stream containing 21% to 100% oxygen.

In the embodiment of FIG. 1, the combustion chamber 10 is supplied with a fuel stream 32 from a fuel delivery system 30 and an oxidant stream 46 from an oxidant delivery system 44. The oxidant delivery system 44 receives an oxygen enriched gas stream 42 from an oxygen enriched gas generation system 40. The oxygen enriched gas stream 42 has an oxygen content of 21% to 100%. According to one embodiment, the oxygen content of the oxygen enriched gas stream is about 90% or greater, preferably about 95% or greater. The fuel is combusted in the combustion chamber 10 heating water from a water supply 50 and generating steam 52. The steam 52 may be delivered to an electric generator 54 for power generation.

In FIG. 1, the flue gas stream 22 exiting the combustion chamber 10 has a flue gas volume which is smaller than a volume of flue gas generated by the boiler when operated with air as the oxidant stream. The flue gas pollutant control system 20 receiving the flue stream 22 from the combustion chamber 10 reduces at least one of particulate matter, $SO_x$, $NO_x$, and mercury in the flue gas to meet emission standards. Due to the reduction in flue gas volume, the pollutant control system 20 is of a smaller cost because of smaller size which achieves similar or better pollution control when compared to a pollution control system needed for the traditional air-fired operation. The flue gas 24 exiting the pollutant control system 20 may be delivered to the stack 60 and/or a $CO_2$ conditioning and sequestration system 70.

Figure 2:
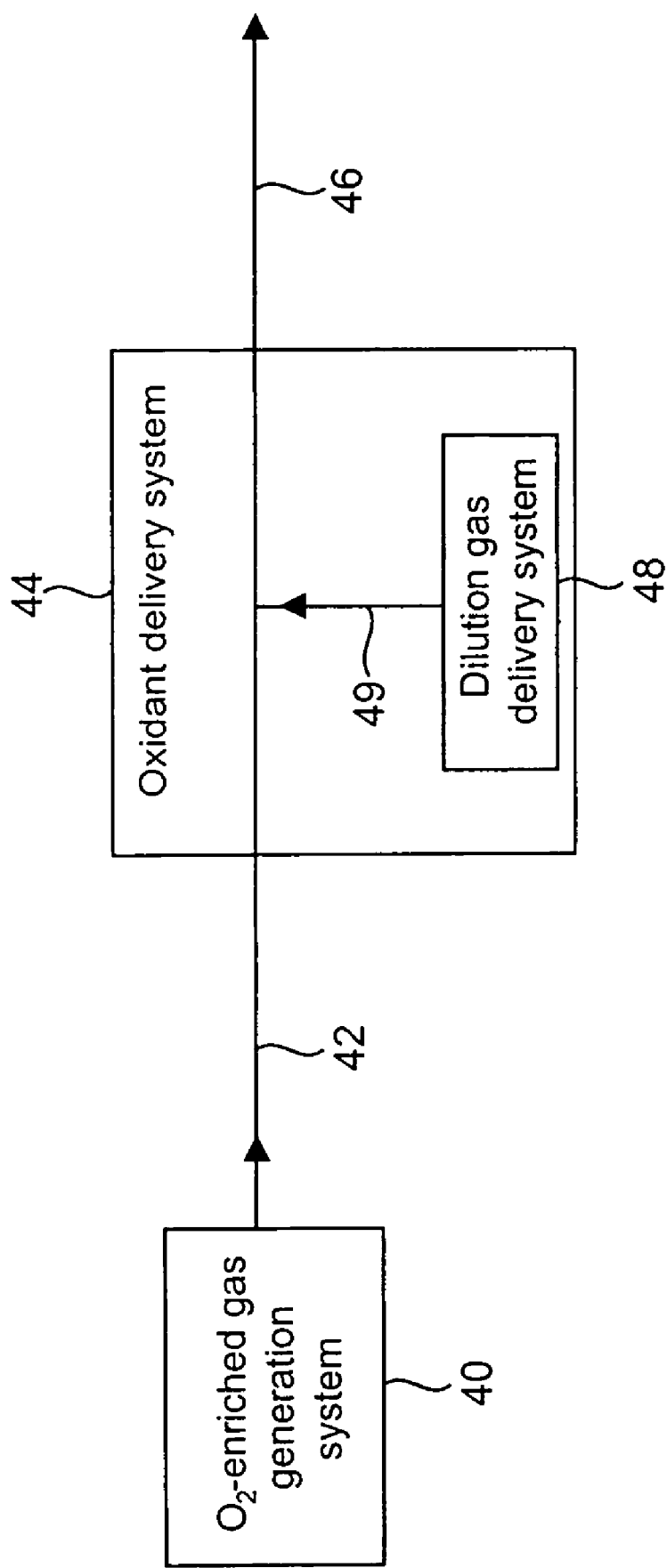
FIG. 2 is a schematic diagram of one embodiment of the oxidant delivery system of FIG. 1 with a dilution gas delivery system.
Figure 3:
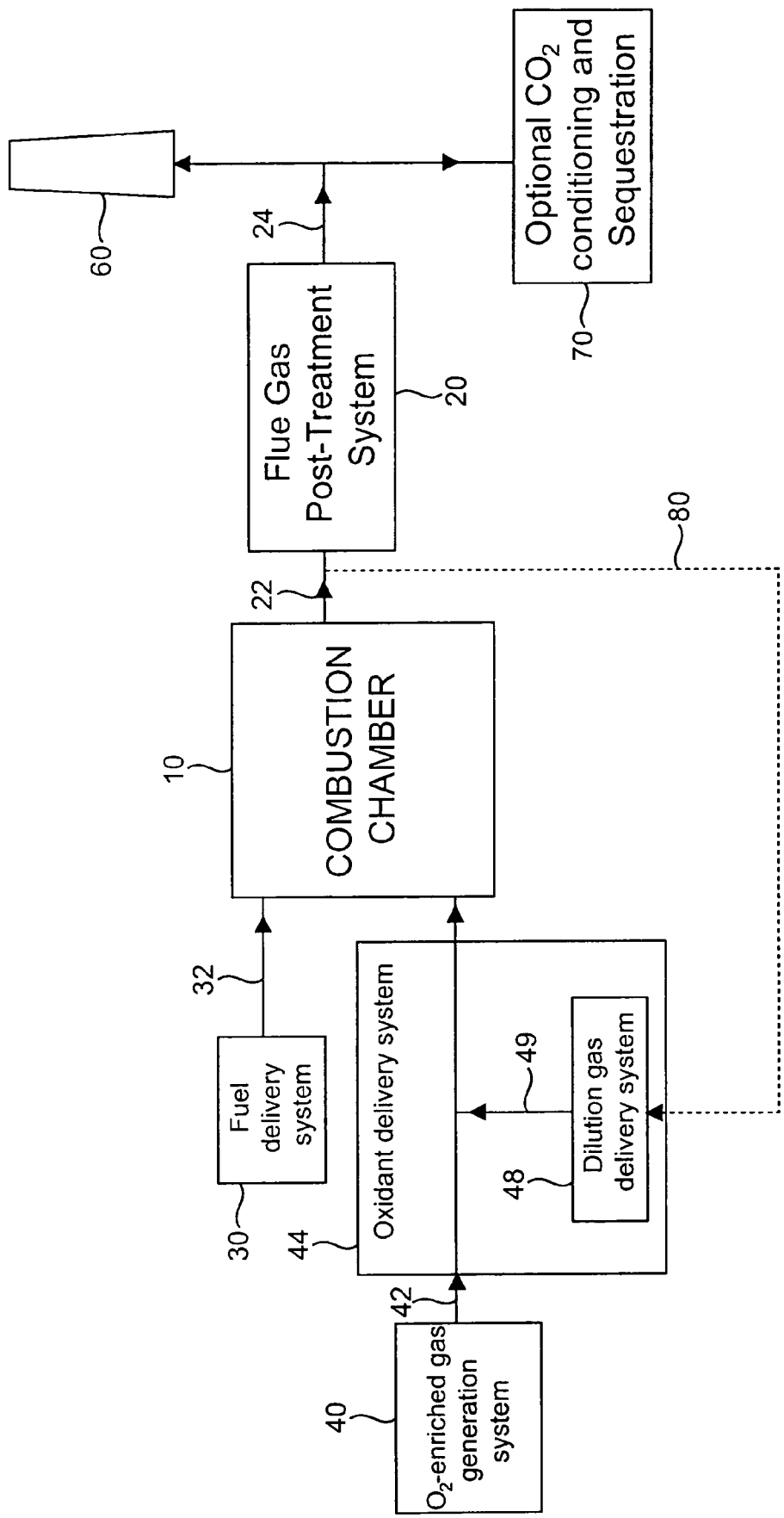
FIG. 3 is a schematic diagram of another embodiment of a steam-generating combustion system with a dilution gas delivery system utilizing recycled flue gas.

FIGS. 2 and 3 illustrate embodiments of the invention in which the combustion system includes an oxidant delivery system including a dilution gas delivery system 48, for providing the oxidant stream 46 to the combustion chamber 10.

The dilution gas delivery system 48 delivers a controlled amount of dilution gas, such as air, $H_2O$, $CO_2$, $N_2$, or flue gas. The dilution gas stream 49 is combined with the oxygen enriched gas stream 42 to form the oxidant stream 46. The oxidant stream 46 may be delivered to the combustion chamber 10 in one or more streams. When the oxidant stream 46 is delivered in more than one stream the plurality of streams may be the same or different with the oxidant stream described being the average of all the oxidant streams as if the oxidant streams were mixed together in a single stream.

As shown in FIG. 3, the dilution gas delivery system may include a recycled or recirculated flue gas stream 80 which is delivered to the oxygen enriched gas stream 42 either alone or in combination with other dilution gases. The dilution gas delivery system 48 controls the delivery of the dilution gas to achieve an oxidant stream 46 in the form of synthetic air with an optimized oxygen content for the particular combustion application. When the dilution gas used is recirculated flue gas, the oxidant mass flow rate injected in the combustion chamber may be equivalent to the oxidant mass flow rate of an air-fired case, but the final mass flow rate to be treated in the pollution control systems is actually lower because of the recirculation which removes a portion of the flue gas. Whereas, if the dilution gas used is air, $N_2$, $CO_2$, or steam, the amount of this dilution gas should be such that the overall oxidant mass flow rate is lower than the air mass flow rate required in an air-fired case.

The combustion chamber 10 may include any industrial steam-generating combustion system where oxygen-enhanced combustion can be implemented such as, but not limited to, power generation plants or steam generation plants in general, coal-fired boilers, gas-fired boilers, and industrial boilers. These steam-generating combustion chambers have not generally used oxygen enhancement so far due to the cost of implementing the oxygen enriched systems while no strong financial fines were associated with some pollutant emissions.

The invention is useful for combustion chambers 10 utilizing gas, liquid, and solid fuels, including natural gas, waste gases from industrial processes, other gaseous fuels, oil, liquid heavy residues, other liquid fuels, coal, coke, stoker, solid heavy residues, and other solid fuels. The solid fuels are usually milled, such as pulverized coal, and conveyed as the fuel stream 32 to the combustion chamber 10 by a conveyor gas which may include air, flue gas, oxidant, or other gas. The liquid fuels may be atomized in steam before entering the combustion chamber 10.

Figure 4:
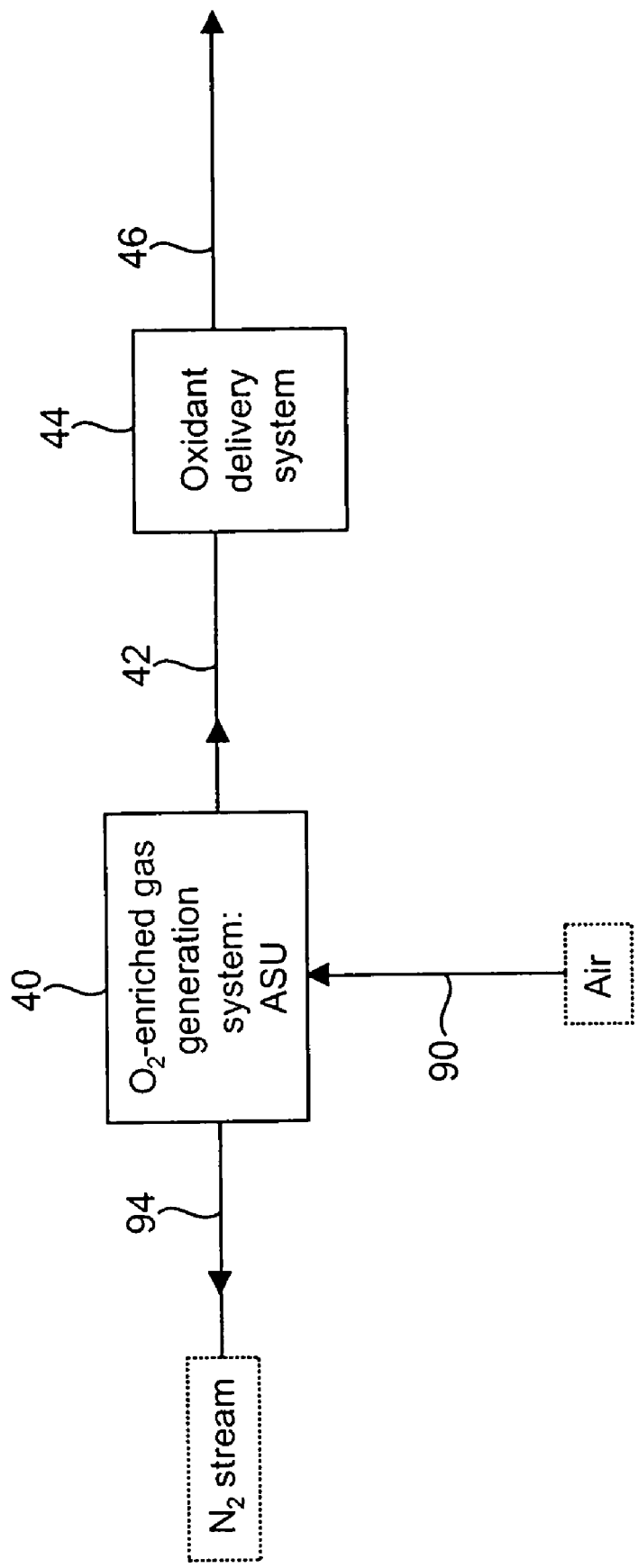
FIG. 4 is a schematic diagram of an additional embodiment of the oxygen-enriched stream generation system of FIG. 1.

In the embodiment of FIG. 4, an air stream 90 is first separated in the air separation unit 40 such as, but not limited to cryogenics, membrane, or an adsorptive PSA or VSA system to produce a high purity oxygen stream, with nitrogen being produced as a byproduct. According to one example, the oxygen stream 42 has a purity of about 90% or greater, preferably 95% or greater and the nitrogen stream 94 has a purity of about 90% or greater, preferably 98% or greater. An argon stream may also be produced which may include a mixture of argon and oxygen requiring an additional separation device to produce a substantially pure argon stream.

The substantially pure oxygen stream 42 or oxygen enriched gas from the air separation unit 40 may be injected into the combustion chamber 10 directly or, the oxygen enriched stream 42 may be mixed with one or more dilution gases by the dilution gas delivery system 48. The oxygen enriched gas generation system may alternatively include a liquid oxygen tank or liquid oxygen delivery pipes.

The flue gas stream 22 resulting from the combustion process is sent to a series of pollutant control units making up the flue gas post-treatment pollutant control system 20. The pollutant control system 20 allows the removal of a portion or the entire amount of one or more of particulate matter, $SO_x$, $NO_x$, and mercury (each of these species being optional, depending on the process) before subsequent use (such as heat recovery systems) or exhaust in the stack 60.

Figure 5:
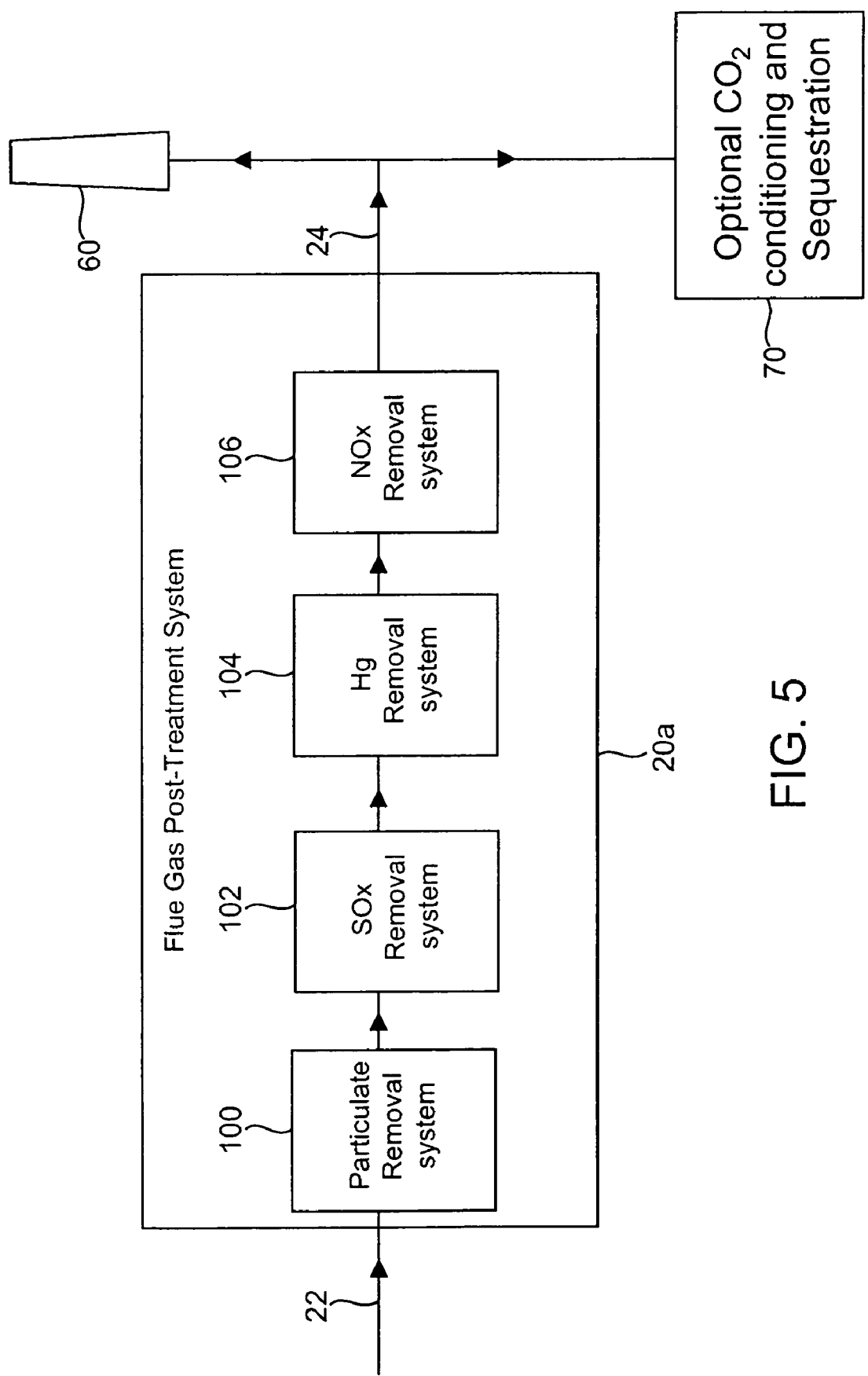
FIG. 5 is a schematic diagram of one embodiment of the flue gas treatment system of FIG. 1.

According to one example, shown in FIG. 5, the pollutant control system 20a includes a particulate matter removal system 100, an $SO_x$ removal system 102, a mercury removal system 104, and a $NO_x$ removal system 106.

In addition, as shown in the figures, the invention may also include an optional $CO_2$ conditioning sequestration or reuse (reuse through enhanced oil recovery, coal bed methane, etc.) site 70. The $CO_2$-rich clean flue gas 24 resulting from this process is delivered to the sequestration site 70 to provide the added bonus of $CO_2$ capture. If the flue gas stream is to be sequester or reused, the required flue gas treatment could be lowered to the level of $CO_2$ conditioning and pipes requirements (maximum content allowed for acid gases resulting from $NO_x$, $SO_x$, etc.).

The systems of the present invention may be implemented by retrofitting existing combustion systems or in new systems. One major interest of this invention is that in either configuration (retrofit or new design), the partially removal of nitrogen in the oxidant stream 46 will reduce the flue gas volume and thus, the mass flow rate by a factor of two and up to a factor of four compared to the air-blown case, which offers significant advantages. One advantage of the elimination of the nitrogen ballast in the oxidant stream 46, without compensating the entire removed amount by a further dilution, is the increase of the adiabatic flame temperature. This phenomenon is the major characteristic of oxygen enriched combustion and can be exploited to increase the efficiency of various combustion systems.

An advantage of the addition of the oxygen enriched gas stream to the combustion system, in addition to this first benefit, is that the reduction in flue gas volume (through nitrogen elimination) will allow the implementation of a much smaller pollutant control system 20, since the size of the flue gas treatment units is mainly based on the volume or mass flow rate of flue gas to be treated. Moreover, in oxygen-fired applications such as in the context of the invention, the absence of diluent nitrogen will lead to concentrated levels of the pollutants in the flue gas. The high pollutant concentrations will enhance their absorption in the different pollutant control systems, improving removal efficiency for all species.

One example of a cost reduction achieved by oxygen enhancement is the example of flue gas desulfurization scrubbers (FGD), these types of units offer excellent $SO_2$ removal efficiencies and are flexible processes, but are relatively capital intensive and costly to operate. One way to reduce FGD costs, while still maintaining at least the same efficiency of $SO_2$ removal, is to reduce the volume of flue gas that needs to be treated. This is exactly what is achieve by the oxygen enhancement. By assuming that the scrubber cost follows a scale-up exponent of 0.6, it can be shown that as oxygen enrichment approaches 100%, capital cost reductions of 50-60% are achievable. A major reduction in the flue gas mass flow rate will thus result in significant FGD savings for utility operators.

Another benefit of the oxygen enhancement is the fact that the elimination of nitrogen from the oxidant streams, along with the recirculation of a portion of the $NO_X$ when recirculating the flue gas, will significantly reduce $NO_x$ formation or destroy some of the $NO_X$ previously formed. A $NO_x$ reduction strategy that combines oxygen enhancement with, for example, a low-$NO_x$ burner and/or an effective combustion staging technique and/or a flue gas recirculation scheme, will reduce $NO_x$ formation rates substantially. In fact, these techniques could even replace conventional $NO_x$ removal processes such as selective catalytic reduction (SCR).

Alternatively, if the $NO_x$ emissions level remains above allowed standards, the reduced volume of flue gas will at least allow the use of $deNO_x$ units 106 of substantially reduced size. With SCR capital costs running at approximately $80/kW, the capital savings will be very significant.

Also, the oxygen enrichment will offer important advantages in term of $CO_2$ capture. The continuing increase in atmospheric $CO_2$ concentrations may prompt new measures to curb $CO_2$ emissions from fossil-fired power plants. Combustion of fossil fuels is considered to be a major contributor to rising $CO_2$ concentrations and it is expected that potential $CO_2$ regulations will eventually target industrial combustion processes using these types of fuel.

Current technologies for the capture, transport, and disposal of $CO_2$ are energy intensive and expensive. Most of the costs are associated with the $CO_2$ separation process rather than transport and sequestration. The most widely accepted technique to remove $CO_2$ from flue gas involves the use of absorbents such as monoethanolamine (MEA) or other chemical reagents. The regeneration of the absorbent is extremely energy intensive and leads to degradation of the reagent, causing corrosion problems. Removal of $CO_2$ from flue gas or an oxygen-enhanced gas stream could be greatly facilitated if the combustion air was replaced with oxygen, such as proposed in the present invention, eliminating the dilution effects of the nitrogen component and the need for flue gas scrubbing. For high oxygen enhancement cases, the cleaned flue gas will contain high levels of $CO_2$, which can be liquefied, compressed, and either sold as a product or delivered to a sequestration site such as an enhanced oil recover (EOR) field. In these cases, the flue gas treatment system 20 also serves as a $CO_2$ purification system.

An economic assessment of the concept of oxygen enhancement can also show the viability of the system and method of oxidant enhanced combustion described above. Of course, the different costs and their repartition will vary from one industrial application to another but a global evaluation can however be performed. The baseline case in one example would be a conventional air-blown process with a FGD unit, a $deNO_x$ unit, mercury and particulate matter removal systems (such as electrostatic precipitators, baghouses, scrubbers, SCR, etc.). The $CO_2$ capture scenario is also considered. In the $CO_2$ capture case, the baseline plant includes a MEA-based scrubbing system. This will not be required for the oxy-combustion case as it inherently produces a $CO_2$-rich effluent.

The capital cost of the oxygen-enhanced combustion system falls by at least about 40%. This estimate is conservative and accounts for the fact that some of the components will not be affected by the lower combustion gas volumes. Likewise, regarding emissions control of $SO_x$, mercury, and particulate matter, costs of related equipments are fall by a conservative about 33%. Due to the very low $NO_x$ formation rates expected for a new plant with oxygen-enhanced combustion, the SCR unit is removed from the process.

These estimates indicate that the capital cost of the air separation unit (ASU) or other gas generation system 40 will be more than offset by the cost reduction linked to the size diminution of the combustion system and pollutant control system 20 and the elimination of the SCR unit. In the $CO_2$ capture scenario, the oxygen-enhanced system has an even clearer cost advantage over the baseline.

On top of this, the air separation unit 40 of FIG. 4 is a multi-product system, generating a substantially pure nitrogen stream 94 in addition to the oxygen stream 42. In a given application, the ASU will be optimized to produce oxygen, nitrogen, and possibly argon at the desired purities and pressures. In one particular case, the ASU may be optimized to produce low-pressure gaseous oxygen for the combustion process, and a high value nitrogen stream. In this way, revenue from the nitrogen by product can offset the costs of producing the oxygen. This analysis suggests that the technology, when applied to a new full-scale commercial plant, is economically viable.

This steam-generating combustion system thus brings a novel approach to multi-pollutant control in industrial combustion processes since it allows a more efficient and cost-effective removal of $SO_x$, $NO_x$, mercury, and particulate matter, this high efficiency being allowed by the implementation of oxygen-enhanced combustion in the combustion system and the resulting dramatic reduction of the amount of flue gas to be treated.

Additionally, when carbon sequestration becomes a reality, the process described allows delivery of the $CO_2$-rich flue gas 24 to a sequestration site with a relatively small amount of processing, thus offering another huge cost advantage over current air fired systems.

The proposed integrated process will thus lead to a new generation of combustion processes, characterized not only by low/zero emissions but also by high efficiency and reduced capital costs, which will dramatically improve their competitiveness in an industrial world more and more stringently regulated in terms of emissions.

Figure 6:
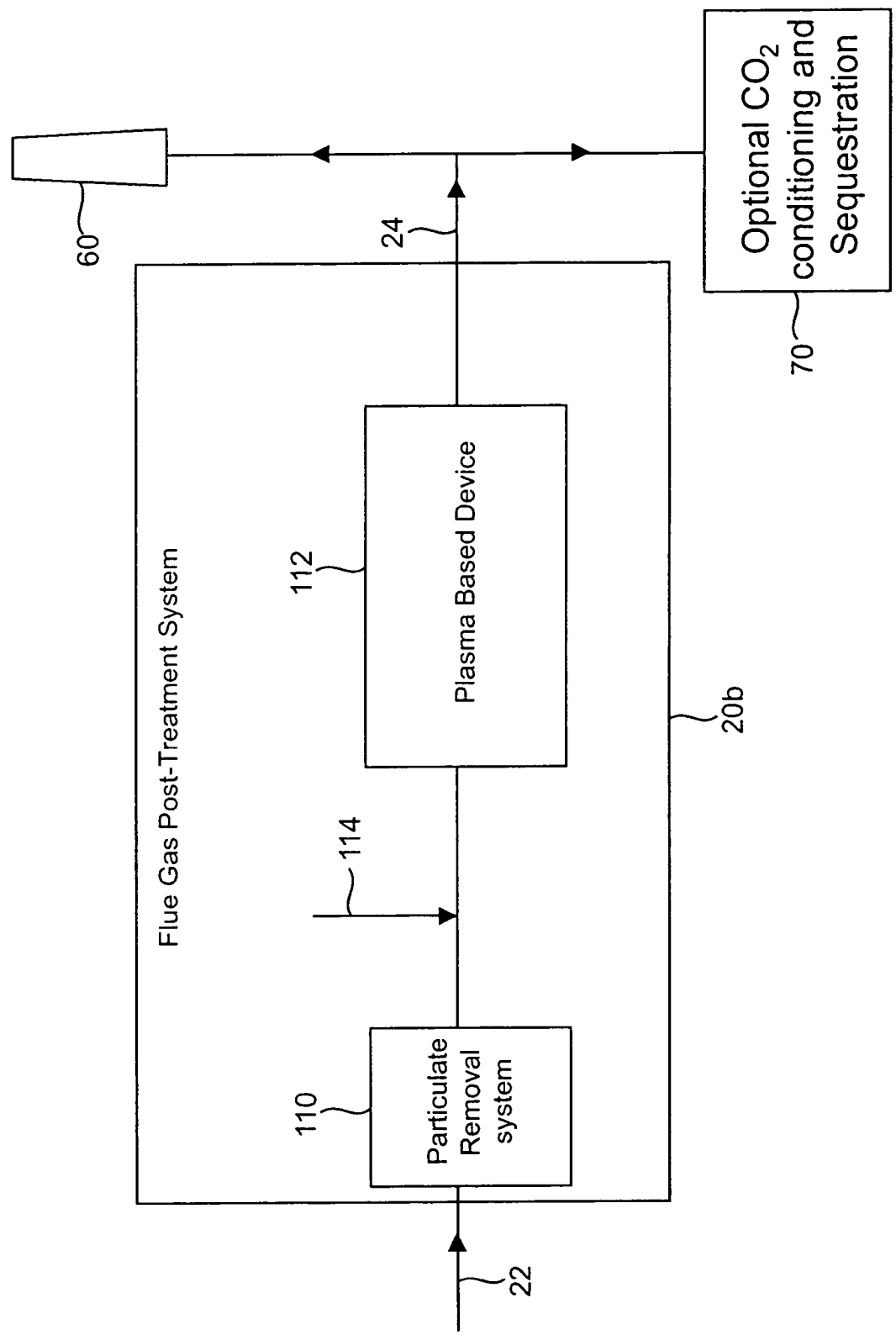
FIG. 6 is a schematic diagram of another embodiment of the flue gas treatment system of FIG. 1.

FIG. 6 illustrates an alternative embodiment of a flue gas post treatment pollutant control system 20b including a plasma-based flue gas treatment device 112. The flue gas stream 22 in FIG. 6 enters a pollutant control system 20b including a particulate removal system 110 and a plasma-based device 112 such as a barrier discharge reactor. The purpose of this device 112 is to generate radical species that oxidize pollutants at relatively low temperatures. Hence NO is oxidized to $NO_2$ and $HNO_3$, $SO_2$ to $SO_3$ and $H_2SO_4$, and Hg to HgO. These higher oxides and particulates are subsequently removed in an absorption vessel, wet-ESP etc. By using oxygen-enhanced oxidants, the volume of flue gas entering the flue gas treatment system is reduced, thereby allowing more compact equipment to be used, and reducing the power consumption of the device. Also, the injection of an oxygen-enhanced oxidant upstream of the plasma-based device 112 could enhance the formation of the radical oxidizing species. This system offers the benefit of reducing the cost of flue gas treatment, and in cases of high oxygen-enhancement, produces a clean, concentrated $CO_2$ stream, which can be marketed or delivered to a sequestration site.

The embodiment of FIG. 6 includes a particulate removal system 110, such as an ESP or baghouse. The plasma-based flue gas treatment device 112 may be any of the known systems, such as one of those described in U.S. Pat. Nos. 6,132,692; 6,117,403; and 5,871,703, which are incorporated herein by reference in their entirety, is used to remove most of the remaining pollutants. In the first stage of this system, a barrier discharge reactor or similar device generates radical species (OH, O etc.) capable of oxidizing pollutants at relatively low temperatures. Hence NO is oxidized to $NO_2$ and $HNO_3$, $SO_2$ to $SO_3$ and $H_2SO_4$, and Hg to HgO. The addition of an oxygen-enhanced oxidant to the inlet stream would raise the oxygen concentration and potentially increase the formation rate of the radical species. The oxidized species and remaining particulates are then removed from the flue gas in an absorption vessel and wet electrostatic precipitator. Removal of $SO_2$ and $NO_2$ may be enhanced by the addition of a reagent such as ammonia. Saleable byproducts such as sulfuric acid, nitric acid, ammonium nitrate, or ammonium sulfate are recovered. This system is also capable of removal of metal species such as Ni, As, Cu, Pb, Zn etc. (McLarnon et al.). This feature will be beneficial to combustion systems that burn metal-containing fuels, for example petroleum coke with its high levels of vanadium and nickel.

The reduced flue gas mass flow rate translates into smaller and/or shorter electrodes in the barrier discharge system 112, a smaller absorption vessel, and smaller wet-ESP. The reduced electrode area will also reduce the power consumption of the discharge plasma. Oxygen enrichment by addition of an oxygen or oxygen-enriched stream 114 to the stream entering the barrier discharge reactor 112 could also enhance formation of the oxidizing species, potentially reducing the required size and power consumption of the device.

Therefore, this system provides a low-cost multi-pollutant control process, and in cases of high oxygen-enhancement, produces a clean, concentrated $CO_2$ stream, which can be marketed or delivered to a sequestration site.

Another embodiment of the invention relates to a method of retrofitting or repowering a commercial air-fired, steam-generating combustion system to reduce overall cost of emission control. The method includes the steps of adding an oxygen-enriched gas generation system to the air-fired, steam-generating combustion system to deliver an oxygen enriched stream with 21% to 100% oxygen, delivering the oxygen-enriched stream to an oxidant delivery system to produce an oxidant stream for the combustion chamber of the combustion system, and achieving a reduced mass flow rate of flue gas exiting the combustion chamber due to enhancement of the oxidant with the oxygen-enriched gas stream. The flue gas pollution control system of the combustion system is modified to take advantage of the flue gas volume reduction and the lower emissions levels of the oxygen-enhanced steam-generating system through: a) replacing at least one device in the flue gas pollution control system of the combustion system with a pollution control device of a smaller size which achieves similar or better pollution control for existing pollutant control devices when pollutant still has to be removed to meet the same standards, b) for new required control devices because of more stringent regulations, adding at least one device in the flue gas pollution control system with a smaller size than the size needed to treat the flue gas generated by this combustion system when operated with air, and/or c) removing the device dedicated to $NO_x$ abatement when the oxygen-enhanced combustion system achieves very low $NO_x$ levels and the device is not required because of the emission reduction achieved.

EXAMPLE

Tables 1, 2, and 3 below compare the costs of three oxygen-fired pulverized coal boilers to the costs of conventional air-fired boilers, over a range of plant sizes. Specifically, the impact of full oxy-combustion on the costs of treating flue gas from coal boilers has been examined, with the understanding that oxy-combustion results in a reduction in flue gas volumes, and consequently a reduction in emission control costs. For a representative comparison, the cost reductions are compared to the capital and operating costs of a dedicated air separation unit (ASU) that provides the oxygen. The tables illustrate that the cost of the ASU is compensated by post-treatment savings so that the overall plant cost is reduced with this invention, and would be even more reduced if the examples were compared with the air-blown plant with $CO_2$ removal system The capital, operating, and total costs are calculated for air- and oxygen-blown plants, for four plant sizes: 30, 100, 200, and 500 MWe power output. Rather than determining costs for the complete power plants, only those elements of the plants that differed between air- and oxygen-firing are included in the analysis. These elements include the following:

a) Flue gas treatment equipment: wet-FGD for $SO_x$, SCR for $NO_x$, activated carbon injection for mercury, and ESP for particulate control.

b) Air separation unit (for $O_2$-fired cases).

c) Boiler (existing unit for air- and retrofit $O_2$-fired cases, new unit for new $O_2$-fired cases).

Each of the three cases described below includes a conventional air-blown boiler with FGD, SCR, ESP, and Hg control. Three $O_2$-fired scenarios (oxygen-enriched gas=fairly pure $O_2$) were considered:

Case 1: The boiler is a retrofit $O_2$-blown system with flue gas recirculation (FGR). FGD, SCR, ESP, and Hg systems are used.

Case 2: The boiler is retrofit $O_2$-blown system with flue gas recirculation (FGR). FGD, ESP, and Hg systems are used. No SCR is required due to the $NO_x$ reductions resulting from oxy-combustion.

Case 3: The boiler is a new, compact full $O_2$-blown unit without FGR or any other dilution gas. FGD, ESP, and Hg systems are used. No SCR is used due to the $NO_x$ reductions resulting from oxy-combustion.

TABLE 1

Capital costs ($MM) of air-fired vs. oxygen-fired systems in three.

| PLANT SIZE (MWe) | | 500 | | 200 | | 100 | | 30 | |
|---|---|---|---|---|---|---|---|---|---|
| | Oxidant | Air | $O_2$ | Air | $O_2$ | Air | $O_2$ | Air | $O_2$ |
| Post-treament Unit Costs | FGD | $129.60 | $83.80 | $78.50 | $55.10 | $59.50 | $41.70 | $36.70 | $25.80 |
| | SCR | $30.70 | $11.40 | $16.90 | $6.30 | $10.80 | $4.00 | $4.90 | $1.80 |
| | Hg (carbon | $0.75 | $0.21 | $0.36 | $0.10 | $0.21 | $0.06 | $0.08 | $0.02 |

TABLE 1-continued

Capital costs ($MM) of air-fired vs. oxygen-fired systems in three.

| PLANT SIZE (MWe) | 500 | | 200 | | 100 | | 30 | |
|---|---|---|---|---|---|---|---|---|
| Oxidant | Air | O$_2$ | Air | O$_2$ | Air | O$_2$ | Air | O$_2$ |
| injection) | | | | | | | | |
| ESP | $25.00 | $8.90 | $13.60 | $4.80 | $8.60 | $3.10 | $3.90 | $1.40 |
| Total Post-treament cost | $186.05 | $104.31 | $109.36 | $66.30 | $79.11 | $48.86 | $45.58 | $29.02 |
| Post-treatment cost vs base case | | -44% | | -39% | | -38% | | -36% |
| oxygen-enriched gas generation cost (ASU) | | $89.80 | | $35.90 | | $22.10 | | $9.50 |
| Case 1 | | | | | | | | |
| Steam generating combustion system (Boiler) | $210.00 | $210.00 | $84.00 | $84.00 | $42.00 | $42.00 | $12.60 | $12.60 |
| Plant capital cost | $396.05 | $404.11 | $193.36 | $186.20 | $121.11 | $112.96 | $58.18 | $51.12 |
| Plant capital cost vs base case | | 2% | | -4% | | -7% | | -12% |
| Case 2 | | | | | | | | |
| steam generating combustion system (Boiler) | $210.00 | $210.00 | $84.00 | $84.00 | $42.00 | $42.00 | $12.60 | $12.60 |
| Plant capital cost | $396.05 | $392.71 | $193.36 | $179.90 | $121.11 | $108.96 | $58.18 | $49.32 |
| Plant capital cost vs base case | | 1% | | -7% | | -10% | | -15% |
| Case 3 | | | | | | | | |
| Steam generating combustion system (Boiler) | $210.00 | $126.00 | $84.00 | $50.40 | $42.00 | $25.20 | $12.60 | $7.60 |
| Plant capital cost | $396.05 | $308.71 | $193.36 | $146.30 | $121.11 | $92.16 | $58.18 | $44.32 |
| Plant capital cost vs base case | | 2-2% | | -24% | | -24% | | -24% |

TABLE 2

Operating costs ($MM/yr) of the three cases of Table 1.

| PLANT SIZE (MWe) | | 500 | | 200 | | 100 | | 30 | |
|---|---|---|---|---|---|---|---|---|---|
| | Oxidant | Air | O$_2$ | Air | O$_2$ | Air | O$_2$ | Air | O$_2$ |
| Post-treatment | FGD | $8.70 | $6.80 | $4.30 | $3.40 | $2.60 | $2.10 | $1.30 | $1.10 |
| | SCR | $1.89 | $1.46 | $0.86 | $0.63 | $0.48 | $0.33 | $0.18 | $0.12 |
| | Hg (carbon injection) | $1.61 | $0.34 | $0.64 | $0.13 | $0.32 | $0.07 | $0.10 | $0.02 |
| | ESP | $9.20 | $3.20 | $4.90 | $1.70 | $3.10 | $1.10 | $1.40 | $0.50 |
| Total Post-treament cost | | $21.40 | $11.80 | $10.70 | $5.86 | $6.50 | $3.60 | $2.98 | $1.74 |
| Post-treatment cost vs base case | | | -45% | | -45% | | -45% | | -42% |
| Oxygen-enriched gas generation (ASU-power) | | | $15.60 | | $6.30 | | $3.10 | | $0.90 |
| Case 1 | | | | | | | | | |
| Plant operating cost | | $21.40 | $27.40 | $10.70 | $12.10 | $6.50 | $6.70 | $2.90 | $2.7 |
| Plant op. cost vs base case | | | 28% | | 13% | | 3% | | -7% |
| Case 2 and 3 | | | | | | | | | |
| Plant operating cost | | $21.40 | $25.90 | $10.70 | $11.50 | $6.50 | $6.40 | $2.90 | $2.50 |
| Plant op. cost vs base case | | | 21% | | 7% | | -2% | | -14% |

TABLE 3

Total annualized costs ($MM/yr) of the three cases of Tables 1 and 2.

| PLANT SIZE (MWe) | | 500 | | 200 | | 100 | | 30 | |
|---|---|---|---|---|---|---|---|---|---|
| | Oxidant | Air | $O_2$ | Air | $O_2$ | Air | $O_2$ | Air | $O_2$ |
| Post-treatment | FGD | $37.20 | $25.30 | $21.50 | $15.50 | $15.70 | $11.30 | $9.40 | $6.80 |
| | SCR | $8.60 | $4.00 | $4.60 | $2.00 | $2.90 | $1.20 | $1.30 | $0.50 |
| | Hg (carbon injection) | $1.80 | $0.40 | $0.70 | $0.20 | $0.40 | $0.10 | $0.10 | $0.00 |
| | ESP | $14.70 | $5.10 | $7.90 | $2.80 | $5.00 | $1.70 | $2.20 | $0.80 |
| Total Post-treatment cost | | $62.30 | $34.80 | $34.70 | $20.50 | $24.00 | $14.30 | $13.00 | $8.10 |
| Post-treatment cost vs base case | | | -44% | | -41% | | -40% | | -38% |
| Oxygen-enriched gas generation (ASU) | | | $35.40 | | $14.20 | | $8.00 | | $3.00 |
| Case 1 | | | | | | | | | |
| Steam generating combustion system (Boiler) | | $46.20 | $46.20 | $18.50 | $18.50 | $9.20 | $9.20 | $2.80 | $2.80 |
| Plant annualized cost | | $108.50 | $116.40 | $53.20 | $53.20 | $33.20 | $31.50 | $15.80 | $13.90 |
| Plant annualized cost vs base case | | | 7% | | 0% | | -5% | | -12% |
| Case 2 | | | | | | | | | |
| Steam generating combustion system (Boiler) | | $46.20 | $46.20 | $18.50 | $18.50 | $9.20 | $9.20 | $2.80 | $2.80 |
| Plant annualized cost | | $108.50 | $112.40 | $53.20 | $51.20 | $33.20 | $30.30 | $15.80 | $13.40 |
| Plant annualized cost vs base case | | | 4% | | -4% | | -9% | | -15% |
| Case 3 | | | | | | | | | |
| Steam generating combustion system (Boiler) | | $46.20 | $27.70 | $18.50 | $11.10 | $9.20 | $5.50 | $2.80 | $1.70 |
| Plant annualized cost | | $108.50 | $93.90 | $53.20 | $43.80 | $33.20 | $26.60 | $15.80 | $12.30 |
| Plant annualized cost vs base case | | | -13% | | -18% | | -20% | | -22% |

While the invention has been described in detail with reference to the preferred embodiments thereof, it will be apparent to one skilled in the art that various changes and modifications can be made and equivalents employed, without departing from the present invention.

What is claimed is:

1. A steam-generating combustion system, comprising:
an oxidant delivery system providing an oxidant stream;
an oxygen enriched gas generation system providing an oxygen enriched gas with 21% to 100% oxygen to the oxidant delivery system;
a fuel delivery system providing a fuel stream with a fuel mass flow rate;
a combustion chamber arranged to receive and combust the fuel stream in the oxidant stream and generate steam, the combustion chamber generating flue gas having a flue gas mass flow rate which is smaller than the mass flow rate of flue gas generated by the combustion chamber when operated with the same fuel mass flow rate and with air as the oxidant stream; and
a flue gas pollutant control system receiving the flue gas from the combustion chamber and reducing the amount of at least one of particulate matter, $SO_x$, $NO_x$, and mercury in the flue gas, wherein the flue gas pollutant control system includes devices having flue gas flow capacities smaller than the flue gas capacity needed to treat a flue gas generated by the combustion chamber when operated with air as the oxidant stream, wherein the oxidant delivery system provides the oxidant stream to the combustion chamber in a plurality of streams having different compositions.

2. A steam-generating combustion system, comprising:
an oxidant delivery system providing an oxidant stream; said oxidant delivery system including a dilution gas delivery system delivering dilution gas to the oxygen enriched gas to form the oxidant stream, said dilution gas comprising recirculated flue gas;
an oxygen enriched gas generation system providing an oxygen enriched gas with 21% to 100% oxygen to the oxidant delivery system;
a fuel delivery system providing a fuel stream with a fuel mass flow rate, said fuel comprising coal;
a combustion chamber arranged to receive and combust the fuel stream in the oxidant stream and generate steam, the combustion chamber generating flue gas having a flue gas mass flow rate which is smaller than the mass flow rate of flue gas generated by the combustion chamber when operated with the same fuel mass flow rate and with air as the oxidant stream;
a flue gas pollutant control system receiving the flue gas from the combustion chamber and reducing the amount of at least one of particulate matter, $SO_x$, $NO_x$, and mercury in the flue gas, wherein the flue gas pollutant control system includes devices having flue gas flow capacities smaller than the flue gas capacity needed to treat a flue gas generated by the combustion chamber when operated with air as the oxidant stream,
an electric generator connected to a stream outlet of the combustion chamber, and
wherein the flue gas pollutant control system includes a plasma-based flue gas treatment device for oxidizing at least one of NO, $SO_2$, and Hg, into water soluble oxides, and wherein the plasma-based flue gas treatment device is enhanced with oxygen injection.

3. A steam-generating combustion system, comprising:
an oxidant delivery system providing an oxidant stream; said oxidant delivery system including a dilution gas delivery system delivering dilution gas to the oxygen enriched gas to form the oxidant stream, said dilution gas comprising recirculated flue gas;
an oxygen enriched gas generation system providing an oxygen enriched gas with 21% to 100% oxygen to the oxidant delivery system;
a fuel delivery system providing a fuel stream with a fuel mass flow rate, said fuel comprising coal;
a combustion chamber arranged to receive and combust the fuel stream in the oxidant stream and generate steam, the combustion chamber generating flue gas having a flue gas mass flow rate which is smaller than the mass flow rate of flue gas generated by the combustion chamber when operated with the same fuel mass flow rate and with air as the oxidant stream;
a flue gas pollutant control system receiving the flue gas from the combustion chamber and reducing the amount of at least one of particulate matter, $SO_x$, $NO_x$, and mercury in the flue gas, wherein the flue gas pollutant control system includes devices having flue gas flow capacities smaller than the flue gas capacity needed to treat a flue gas generated by the combustion chamber when operated with air as the oxidant stream,
an electric generator connected to a stream outlet of the combustion chamber, and
wherein the flue gas pollutant control system includes a plasma-based flue gas treatment device for oxidizing at least one of NO, $SO_2$, and Hg, into water soluble oxides, and
comprising an absorption vessel and a wet electrostatic precipitator receiving the water soluble oxides from the plasma-based flue gas treatment device and reducing the amount of the water soluble oxides.

4. A method of steam-generating combustion, comprising:
providing an oxidant enriched gas stream with an oxygen content of 21% to 100%;
creating an oxidant stream containing recirculated flue gas the oxygen enriched gas stream;
combusting a fuel in the oxidant stream in a steam-generating combustion chamber and generating flue gas having a flue gas mass flow rate which is smaller than a mass flow rate of flue gas generated by the combustion chamber when operated with the same mass flow rate of fuel and with air as the oxidant stream the fuel comprising coal; and
reducing the amount of at least one of particulate matter, $SO_x$, $NO_x$, and mercury in the flue gas with a flue gas pollutant control system wherein the flue gas pollutant control system includes devices having flue gas flow capacities smaller than the flue gas capacity needed to treat a flue gas generated by the combustion chamber when operated with air as the oxidant stream,
generating electrical power with an electric generator connected to a stream outlet of the combustion chamber, and
wherein the oxidant stream is delivered to the combustion chamber in a plurality of streams having different compositions.

5. A method of steam-generating combustion, comprising:
providing an oxidant enriched gas stream with an oxygen content of 21% to 100%;
creating an oxidant stream containing recirculated flue gas the oxygen enriched gas stream;
combusting a fuel in the oxidant stream in a steam-generating combustion chamber and generating flue gas having a flue gas mass flow rate which is smaller than a mass flow rate of flue gas generated by the combustion chamber when operated with the same mass flow rate of fuel and with air as the oxidant stream the fuel comprising coal; and
reducing the amount of at least one of articulate matter $SO_x$, $NO_x$, and mercury in the flue gas with a flue gas pollutant control system wherein the flue gas pollutant control system includes devices having flue gas flow capacities smaller than the flue gas capacity needed to treat a flue gas generated by the combustion chamber when operated with air as the oxidant stream,
generating electrical power with an electric generator connected to a stream outlet of the combustion chamber, and
wherein the flue gas pollutant control system includes a plasma-based flue gas treatment device for oxidizing at least one of NO, $SO_2$, and Hg, into water soluble oxides.

6. The method of claim 5, wherein the plasma-based flue gas treatment device is enhanced with oxygen injection.

7. The method of claim 5, comprising an absorption vessel and a wet electrostatic precipitator receiving the water soluble oxides from the plasma-based flue gas treatment device and reducing the amount of the water soluble oxides.

* * * * *

UNITED STATES PATENT AND TRADEMARK OFFICE
CERTIFICATE OF CORRECTION

| | | |
|---|---|---|
| PATENT NO. | : 7,320,288 B2 | Page 1 of 1 |
| APPLICATION NO. | : 11/140868 | |
| DATED | : January 22, 2008 | |
| INVENTOR(S) | : Ovidiu Marin et al. | |

It is certified that error appears in the above-identified patent and that said Letters Patent is hereby corrected as shown below:

In Column 16, line 26, replace the word "articulate" with the word --particulate--.
In Column 16, line 26, place a --,-- after the word "matter".

Signed and Sealed this

Twentieth Day of April, 2010

David J. Kappos
*Director of the United States Patent and Trademark Office*